United States Patent
Zhou et al.

(10) Patent No.: US 9,603,093 B1
(45) Date of Patent: Mar. 21, 2017

(54) METHODS AND SYSTEMS FOR USING A LOAD METRIC BASED ON TIME AND VARIANCE OF USING RF RESOURCES TO SELECT AN RF COVERAGE AREA

(71) Applicant: Sprint Spectrum L.P., Overland Park, KS (US)

(72) Inventors: Yu Zhou, Herndon, VA (US); Muhammad A. Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 109 days.

(21) Appl. No.: 14/327,419

(22) Filed: Jul. 9, 2014

(51) Int. Cl.
*H04W 52/02* (2009.01)
*H04W 64/00* (2009.01)

(52) U.S. Cl.
CPC ..... *H04W 52/0245* (2013.01); *H04W 64/003* (2013.01)

(58) Field of Classification Search
CPC ............. H04W 24/08; H04W 52/0245; H04W 64/003; H04W 28/0226; H04W 72/085; H04W 72/1268
See application file for complete search history.

(56) References Cited

U.S. PATENT DOCUMENTS

| | | | | |
|---|---|---|---|---|
| 6,445,707 B1 * | 9/2002 | Iuoras | ................. | H04L 12/5602 370/232 |
| 2004/0047289 A1 * | 3/2004 | Azami | ............... | H04L 12/5695 370/230 |
| 2009/0080342 A1 * | 3/2009 | Frederiksen | ........ | H04L 43/0876 370/253 |
| 2014/0148149 A1 * | 5/2014 | Kwan | ................... | H04W 24/08 455/422.1 |

OTHER PUBLICATIONS

Prof. Ziaohu You, Cell Edge Performance of Cellular Mobile Systems, National Mobile Comm. Research Lab., Southeast University, Shanghai Wireless Comm. Research Center, Sep. 20, 2010, 32 pages.

Award Solutions, LTE University, LTE 901, LTE Network Reference, Mar. 10, 2011, one page.

Award Solutions, LTE University, LTE 902, LTE-EPC and IMS Reference, Mar. 10, 2011, one page.

(Continued)

*Primary Examiner* — Michael Thier
*Assistant Examiner* — Prince A Mensah

(57) ABSTRACT

Aspects of selecting a base station or coverage area for a UE device are described. The UE device or a wireless network component (e.g., a base station) can determine RF uplink use values of a coverage area sector or cell. The RF uplink use values can be received from one or more base stations and can be based on a subframe or other time segment. The UE device can determine an average and variation of the RF uplink use values, and a load metric. The load metric can indicate a load pattern of an RF uplink. A selection of the base station or coverage area can be based on the load metric and whether the UE device is located or operating at an edge of a cell or coverage area. The UE device, while idle, can continue or switch to camping on the selected base station or coverage area.

24 Claims, 8 Drawing Sheets

(56) References Cited

OTHER PUBLICATIONS

Single-carrier FDMA, downloaded from the World Wide Web at https://en.wikipedia.org/wiki/Single-carrier_FDMA, on Jun. 25, 2014, pp. 1-4.
Teletopix, Teletopix Resource Block Architecture, downloaded from the World Wide Web at http://www.teletopix.org/4g-lte/lte-frame-structure-and-resource-block-architecture-attachment-lte-resource-block-architecture/ on Jan. 28, 2013, two pages.
Linear Technology, Dual 2.3 GHz to 4.5GHz High Synamic Range Downconverting Mixer, LTC5593, Oct. 11, 2011, pp. 1-28.
LTE OFDM, Orthogonal Frequency Division Multiplex, downloaded from the World Wide Web at http://www.radio-electronics.com/info/cellulartelecomms/lte-long-term-evolution/lte-ofdm-ofdma-scfdma.php on May 19, 2014, 4 pages.
IXIA, SC-FDMA Single Carrier FDMA in LTE, Jun. 25, 2014, 16 pages.
Long Term Evolution, LTE, Uplink and Downlink of LTE, downloaded from the World Wide Web at http://desmondkhoolte.blogspot.com/2012/03/uplink-and-downlink-of-lte.html on May 24, 2014, 2 pages.
Scott Baxter, LTE Long Term Evolution, Introduction, Air Interface, Core Network, Operation, Course 511, V3.0, Nov. 2013, 83 pages.
U.S. Appl. No. 14/327,354, entitled "Methods and systems for cell selection using uplink load measurements," filed Jul. 9, 2014, 56 pages.

\* cited by examiner

METHODS AND SYSTEMS FOR USING A LOAD METRIC BASED ON TIME AND VARIANCE OF USING RF RESOURCES TO SELECT AN RF COVERAGE AREA

BACKGROUND

Unless otherwise indicated herein, the elements described in this section are not prior art to the claims and are not admitted to be prior art by inclusion in this section.

A user equipment (UE) device that performs wireless communications can carry out wireless communications, in part, by transmitting signals to a base station on a radio frequency (RF) uplink and receiving signals from the base station using an RF downlink. The signals transmitted by the base station can form a coverage area (e.g., a cell or sector) in which the UE device can carry out communication using the base station. In some cases, a UE device can include a mobile UE device that moves from a location near the base station to a location at an edge of the base station's coverage area. As the UE device moves farther away from the base station and closer to the edge of the coverage area, the power required to transmit a signal from the UE device to the base station typically increases. A battery providing power to operate the UE device typically loses its charge more quickly when the UE device is using greater amounts of power to transmit signals to the base station. Methods and systems that pertain to a UE device using less power can be beneficial in many ways.

OVERVIEW

This application describes several example embodiments, at least some of which pertain to selection of a coverage area, or a base station providing the coverage area, for a UE device and a communication system serving the UE device. Aspects of determining a load metric for use in selecting the coverage area or base station can be carried out by the UE device or a device (e.g., a base station) within the communication system in which the UE device and base station operate. The load metric can be based on, at least in part, time and variance of RF resources, such as RF uplink resources of coverage areas provided by base stations in proximity to the UE device. The time and variance can correspond to instantaneous peak RF utilization of the coverage areas.

In a first respect, an example embodiment can take the form of a method comprising (i) determining, by a processor, first wireless uplink subframe utilization values (WU-SUV), wherein the first WUSUV pertain to a first base station and a first time period, (ii) determining, by the processor, a variance of the first WUSUV, (iii) determining, by the processor, an average of the first WUSUV, (iv) determining, by the processor, a first load metric, based on, at least in part, the variance of the first WUSUV and the average of the first WUSUV, and (v) transmitting, by a transmitter using a wireless downlink, at least one of the first load metric and a selection the processor makes based on, at least in part, the first load metric.

In another respect, an example embodiment can take the form of a method comprising: (i) determining, by a processor, a first load metric based on, at least in part, a variance of first WUSUV and an average of the first WUSUV, wherein the first WUSUV pertain to a first base station and a first time period, (ii) determining, by the processor, a second load metric based on, at least in part, a variance of second WUSUV and an average of the second WUSUV, wherein the second WUSUV pertain to a second base station and the first time period, (iii) comparing, by the processor, at least the first load metric and the second load metric to determine a comparison of at least the first load metric and the second load metric, (iv) selecting, by the processor, one of at least the first base station and the second base station based on the comparison of at least the first load metric and the second load metric, and (v) performing, by the processor, an action based on, at least in part, selecting the one of at least the first base station and the second base station.

In yet another respect, an example embodiment can take the form of a system comprising: a processor and a computer-readable medium storing computer-readable program instructions, that when executed by the processor, perform a set of functions, wherein the set of functions comprises: (i) determining, by the processor, a first load metric based on, at least in part, a variance of first WUSUV and an average of the first WUSUV, wherein the first WUSUV pertain to a first base station and a first time period, (ii) determining, by the processor, a second load metric based on, at least in part, a variance of second WUSUV and an average of the second WUSUV, wherein the second WUSUV pertain to a second base station and the first time period, (iii) comparing, by the processor, at least the first load metric and the second metric to determine a comparison of at least the first load metric and the second load metric, (iv) selecting, by the processor, one of at least the first base station and the second base station based on the comparison of at least the first load metric and the second load metric, and (v) performing, by the processor, an action based on, at least in part, selecting one of at least the first base station and the second base station.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

This description describes the example embodiments and several figures accompanying the description. The example embodiments can be applicable to a UE device that is operating in an idle mode (e.g., the UE device is camped on, but is not connected to, a base station) and when the UE device is operating in a connected mode (e.g., the UE device is connected to a base station for carrying out a data session, such as a voice call or an Internet browsing session).

A device, such as a UE device or a base station in a communication system including the UE device and the base station, can determine the load metric and select a coverage area or base station based on, at least in part, the load metric or can provide the load metric to another device that can select the coverage area or base station for the UE device to hand over to or to camp on. When the UE device is operating within an edge of a coverage area, it can be beneficial for the RF resources selected for that UE device to provide maximum uplink transmission opportunities in a time domain. The load metrics described herein can provide information about maximum uplink transmission opportunities (or usage) in the time domain for a base station in proximity to the UE device.

Within the description and figures, the articles "a," "an," or "the" are used to introduce elements of the example embodiments. The intent of using those articles is that there is one or more of the elements. The intent of using the conjunction "or" within a list of at least two terms in the description or figures is to indicate any of the listed terms or any combination of the listed terms. The use of ordinal numbers such as "first," "second," "third" and so on in the description or figures is to distinguish respective elements rather than to denote a particular order of those elements unless the context of using those terms explicitly indicates otherwise.

The diagrams, depictions, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions or operations) can be used instead. Each element or components of an element shown in the figures or described in this description, alone or in combination with one or more other elements or components of the one or more other elements, can be referred to as a system or a machine. Furthermore, various functions or operations described as being performed by one or more elements can be carried out by a processor executing computer-readable program instructions or by any combination of hardware, firmware, or software.

II. Example System Architecture

Figure 1:
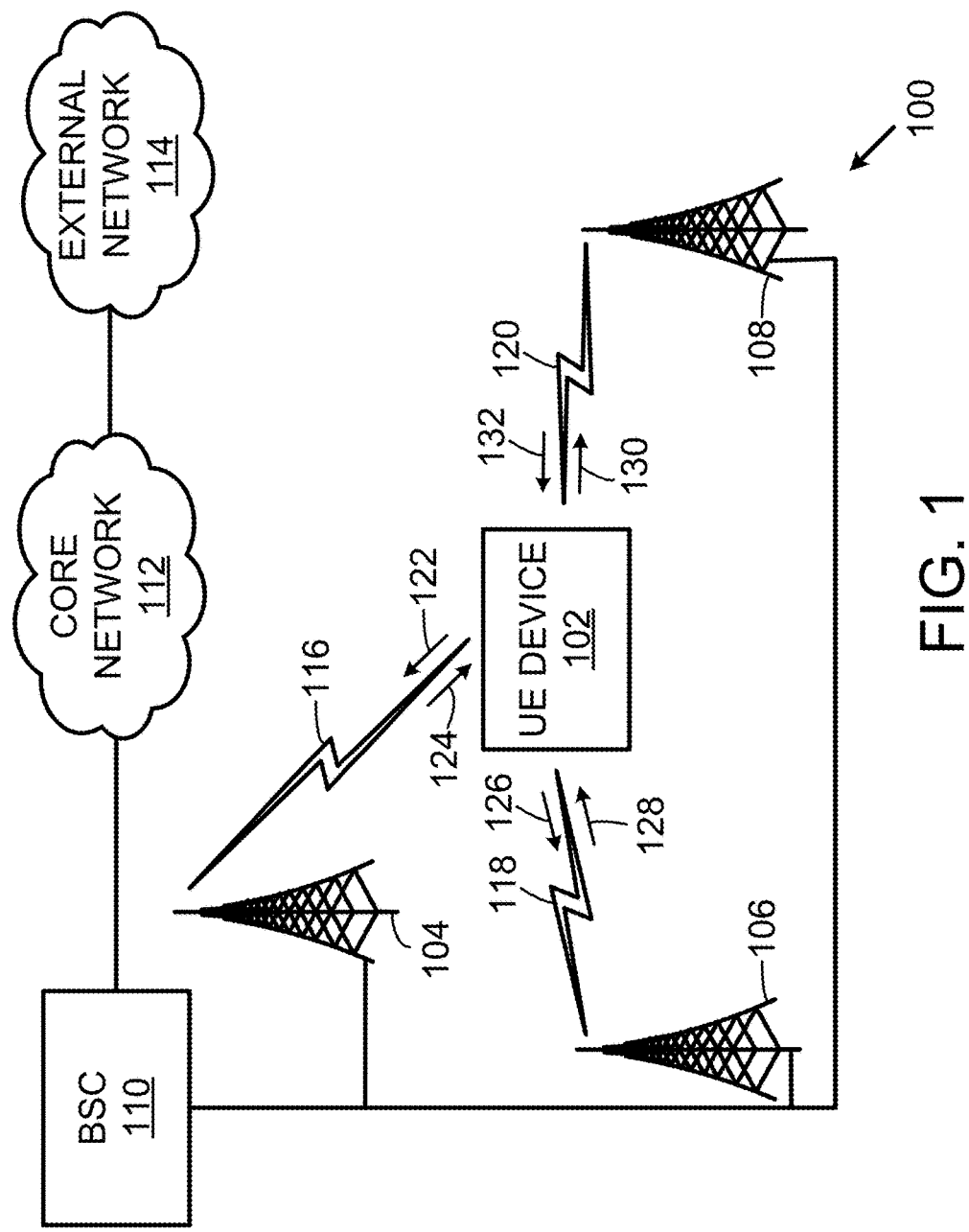
FIG. 1 is a diagram showing a communication system in accordance with the example embodiments described herein.

FIG. 1 is a diagram showing an example communication system 100 in accordance with one or more of the example embodiments disclosed herein. Communication system 100 (or more simply, system 100) includes a UE device 102, base stations 104, 106, and 108, base station controller (BSC) 110, a core network 112, and external network 114. System 100 can include one or more other UE devices, one or more other base stations, one or more other BSCs, one or more other core networks, or one or more other elements, some of which are described below. System 100 can be referred to as a communication network.

Each base station shown in FIG. 1 can provide one or more RF coverage areas (e.g., one or more sectors or one or more cells) in which UE devices, such as UE device 102, can carry out wireless communications using an air interface protocol associated with the RF coverage area(s). Each coverage area can include an edge and a non-edge portion. Typically, the non-edge portion, relative to the edge portion, is closer to the base station. Portions of two or more RF coverage areas can overlap each other. A base station can handover a UE device as the UE device is moved from one RF coverage area to another RF coverage area.

Each RF coverage area can be associated with one or more frequency bands. Each frequency band can be referred to by a single frequency, such as an 800 megahertz (MHz) frequency band. Each frequency band can be wider than a single frequency or include two or more frequency ranges. For instance, an 800 MHz frequency band, used for frequency division duplexing (FDD), can include uplink channels (also known as reverse-link channels) within the range 806-824 MHz, inclusive, and downlink channels (also known as forward-link channels) within the range 851-869 MHz, inclusive. Two distinct frequency ranges, such as the two aforementioned frequency ranges, can be referred to as paired frequency ranges. The range between 824 MHz and 851 MHz can be referred to as a frequency offset. A frequency band or range can be segmented into multiple segments for assigning to separate sub-carriers or sets of sub-carriers. For instance, a frequency band or a portion of a frequency band 180 kHz wide can be segmented into twelve segments 15 kHz wide for assigning to twelve sub-carriers.

FIG. 1 shows RF communication links 116, 118, and 120 between base stations 104, 106, and 108, respectively, and UE device 102. Arrows 122, 126, and 130 in FIG. 1 represent the uplink portions of RF communication links 116, 118, and 120, respectively. Arrows 124, 128, and 132 in FIG. 1 represent the downlink portions of RF communication links 116, 118, and 120, respectively. At any given time, a UE device may be within one or more coverage areas formed by one or more base station or the UE device may not be within any coverage area formed by a base station.

A base station and a UE device can communicate over a frequency band using a radio access technology (RAT) that can be defined, at least in part, by an air interface protocol. Examples of an air interface protocol used by a base station and a UE device include, but are not limited to, long term evolution (LTE), code division multiple access (CDMA), WiMAX®, integrated digital enhanced network (IDEN), global system for mobile communications (GSM), general packet radio service (GPRS), universal mobile telecommunications system (UMTS), enhanced data rates for GSM evolution (EDGE), multichannel multipoint distribution service (MMDS), mobile broadband wireless access (MWBA), WiFi®, and BLUETOOTH®. The LTE protocol was defined by the 3$^{rd}$ Generation Partnership Project (3GPP). One or more of the LTE, WiMAX®, and MWBA protocols can use an orthogonal frequency division multiple access (OFDMA) protocol for downlink communications and a single carrier frequency division multiple access (SC-FDMA) protocol for uplink communications.

Base stations 104, 106, and 108 can be configured in any of a variety of base station arrangements. Three particular example base station arrangements are described below.

Other example arrangements of one or more of base stations 104, 106, and 108 are also possible.

As a first example, base station 104 can be configured as or include a base station of an evolved UMTS terrestrial radio access network (E-UTRAN) for an evolved system defined by the 3GPP. A radio network including a base station and UE device within an E-UTRAN can operate according to an LTE standard defined by the 3GPP. A base station in a communication system operating within an E-UTRAN or according to the LTE standard can be referred to as an evolved Node B (eNode-B). An e-Node-B can connect directly to core network 112.

In accordance with one or more example embodiments, base station 106 and base station 108 and other base station(s) (not shown) in system 100 can also be configured as or include an e-Node B. A base station of those embodiments can operate using any one of two or more frequency bands used by system 100.

As a second example, base station 106 can be configured as or include a base station of a UMTS terrestrial radio access network (UTRAN) for a 3G system defined by the 3GPP. A radio network, including a base station and UE device within a UTRAN can operate according to a wideband CDMA (W-CDMA) standard defined or adopted by the 3GPP. A base station in a network operating according to the UMTS can be referred to as a Node-B. In accordance with this second example, system 100 can include a radio network controller (RNC) or BSC 110 can be configured as or include an RNC. An RNC can control one or more Node-Bs that connect to the RNC. An RNC can include one or more gateways for connecting to and communicating with core network 112.

In accordance with one or more example embodiments, base station 104 and base station 108 and other base station(s) (not shown) in system 100 can also be configured as or include a Node-B. The base station of those embodiments can operate using any one of two or more frequency bands used by system 100.

As a third example, base station 108 can be configured as or include a base station of an EIA-TIA-95A network, a CDMA2000 network, or a GSM network. A radio network, including a base station and UE device within one or those networks can operate according to a CDMA standard, such as CDMA2000-1× or CDMA2000-1×-EVDO. In accordance with one or more example embodiments, base station 104 and base station 106 and other base station(s) (not shown) in system 100 can also be configured as base station 108 described in this third example. The base station of those embodiments can operate using any one of two or more frequency bands used by system 100.

BSC 110 controls or is configured to control one or more base stations. BSC 110 can be configured as or include an RNC. Some or all of the functions carried out by BSC 110 can be carried out by or within core network 112 such that a base station can connect directly to core network 112.

FIG. 1 shows a single UE device. One or more UE devices can operate within each coverage area provided by each base station within system 100. Each UE device operating within system 100 can be configured like UE device 102, but is not so limited. The functions and methods described herein with respect to UE device 102 can also be performed by or for one or more other UE devices operating within system 100.

UE device 102 can be served by a base station within system 100. In one respect, UE device 102 can be a mobile UE device. A mobile UE device can be moved from a first coverage area to a second coverage area, operate with a first base station while located in the first coverage area and while moving towards the second coverage area, and switch to operate with a second base station after entering the second coverage area. A base station with which UE device 102 is operating can be referred to as a serving base station. A serving base station can cause registration of the UE device in a home location register so that communications, such as a voice call or electronic message can be routed to UE device 102. A base station that is available for a UE device to handover to can be referred to as a target base station. A UE device operating with a base station can include, but is not limited to, the base station idling on the base station or the UE device being connected to the base station.

In another respect, a UE device can be a stationary UE device that operates at a fixed location (e.g., a location within a house or office building). The fixed location may include, but is not limited to, a location at which the stationary UE device can receive electrical power to operate the UE device from a power outlet within a wall of the house or office building.

UE device 102 can be configured as or include any of a variety of wireless communication devices. For example, UE device 102 can be configured as or include a mobile phone, a cellular phone, a feature phone, a smart phone, a personal digital assistant, a tablet computing device, or a laptop or desktop personal computer including a wireless modem, such as a 3G/4G USB modem 250U sold by Sprint®.

UE device 102 can be configured as or include a multi-band UE device, such as a dual-band UE device or a tri-band UE device. A dual-band UE device can include transmitters for transmitting RF signals within two distinct frequency bands, and can include receivers for receiving RF signals within two distinct frequency bands. One or more of the frequency bands used by a transmitter of a dual-band UE device can be the same as a frequency band used by the receiver of the dual-band UE device. One or more of the frequency bands used by a transmitter of a dual-band UE device can be different than a frequency band used by the receiver of the dual-band UE device. As an example, the frequency bands used by a dual-band UE device can be the 800 megahertz (MHz) frequency band and the 1.9 Gigahertz (GHz) frequency band. Other examples of frequency bands used by a dual-band UE device are also possible.

A tri-band UE device can include transmitters for transmitting RF signals within three distinct frequency bands, and can include receivers for receiving RF signals within three distinct frequency bands. One or more of the frequency bands used by a transmitter of a tri-band UE device can be the same as a frequency band used by the receiver of the tri-band UE device. One or more of the frequency bands used by a transmitter of a tri-band UE device can be different than a frequency band used by the receiver of the tri-band UE device. As an example, the frequency bands used by a tri-band UE device can be the 800 MHz frequency band, the 1.9 GHz frequency band, and the 2.5 GHz frequency band. Other examples of frequency bands used by a tri-band UE device are also possible.

The example embodiments are also applicable to multi-band UE devices that are operable within more than three frequency bands. For instance, the example embodiments are applicable to a quad-band UE device.

Core network 112 can include a network of core network elements that provides network services to a UE device operating within communication system 100. A service provider, such as the Sprint Corporation, Overland Park, Kans., can operate core network 112 or a portion thereof.

The core network elements can include, but are not limited to, a gateway, a processor, a computer-readable medium, a switch, or a communication link connecting two or more other core network elements. The components of core network 112, as well as the components that connect a UE device to core network 112, can perform various services for the UE device that connects to core network 112. For example, a gateway can connect core network 112, or a device within or accessing core network 112, to external network 114. Core network 112 can connect to a UE device, such as UE device 102, using an e-Node-B, an RNC, or a BSC of a radio network and, in turn, connect that UE device to external network 114 or to another device within or connected to external network 114.

External network 114 can include one or more external networks that are connected to or are connectable to core network 112 or to another portion of communication system 100. UE device 102 can carry out a communication session with a device within external network 114 or another device that can connect to external network 114. As an example, external network 114 can include the public switched telephone network (PSTN), or another core network (such as another core network operated by a service provider of core network 112 or by another service provider). As another example, external network 114 can include the Internet or a portion of the Internet accessible by core network 112. As yet another example, external network 114 can include an Internet Protocol Multimedia Subsystem (IMS) network. Other examples of external network 114 are also possible.

Figure 2:
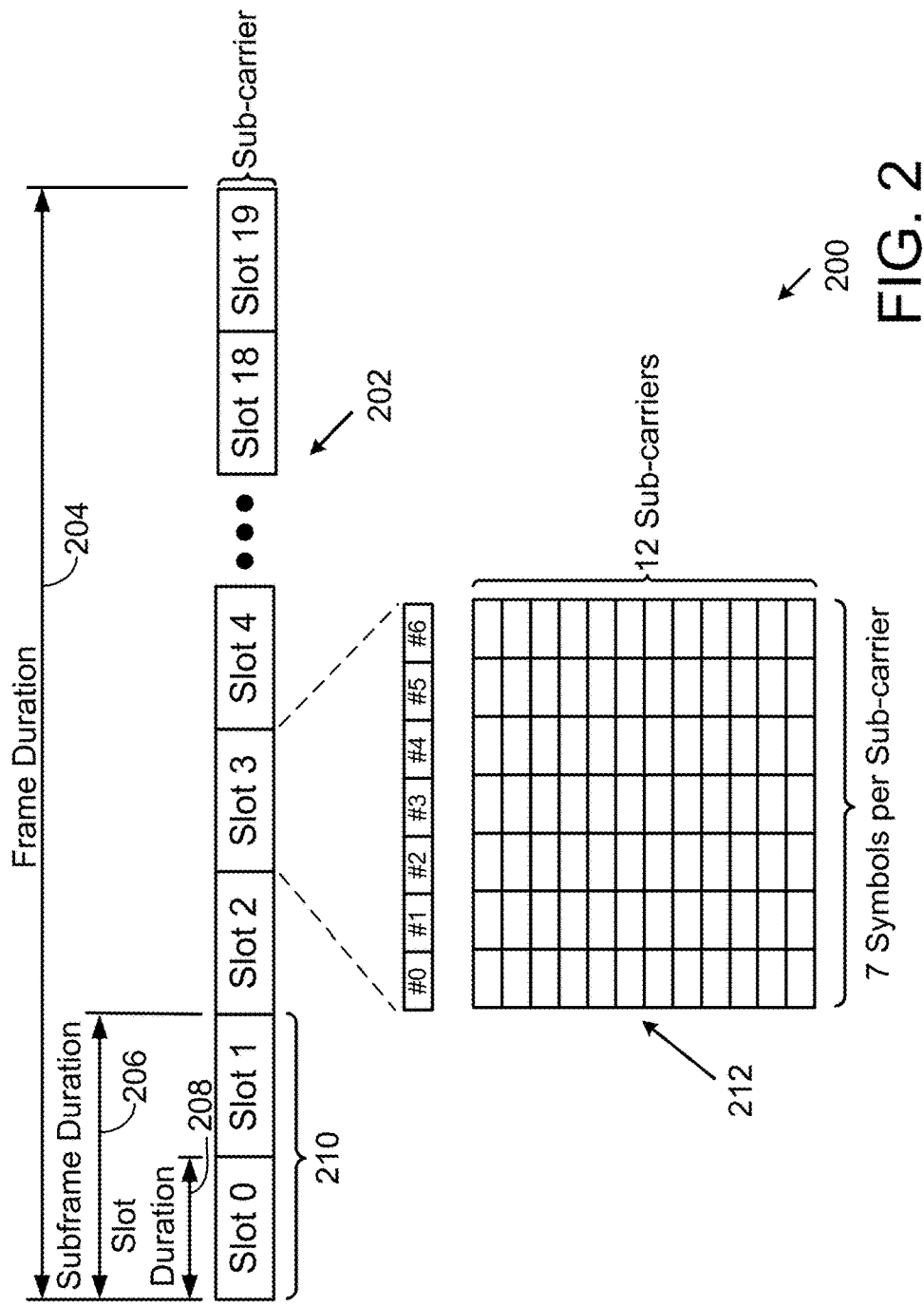
FIG. 2 is a simplified block diagram of showing aspects of a frame for communicating data within the communication system shown in FIG. 1.

Next, FIG. 2 is a diagram 200 showing aspects of a frame 202 for communicating data within communication system 100 or some other system or network. Frame 202 can be carried by one of a plurality of subcarriers within a frequency band used by a base station or UE device. An uplink frame (e.g., a frame transmitted over or carried on an uplink channel) can be configured like frame 202, but is not so limited. A downlink frame (e.g., a frame transmitted over or carried on a downlink channel) can be configured like frame 202, but is not so limited. Frame 202 can be arranged in accordance with the LTE protocol using FDD or another protocol. A communication link carrying frame 202 can carry one or more other frames prior to, while, or after carrying frame 202.

Frame 202 can include 20 slots (e.g., slots numbered 0 to 19) that occur over a frame duration 204 (e.g., a time duration of 10 milliseconds (ms)). Two adjacent slots within frame 202 can be referred to as a subframe. A subframe can occur over a subframe duration 206 (e.g., a subframe duration of 1 ms). As an example, slot 0 and slot 1 can be referred to as subframe 210. Each slot occurs over a slot duration (e.g., slot 0 occurs over slot duration 208). As an example, slot duration 208 can be 0.5 ms. A duration of a slot or subframe can define a transmission time interval for a base station, UE device, or network.

Each slot of frame 202 can include a quantity of symbols, such as three, six, or seven symbols. As shown in FIG. 2, slot 3 includes seven symbols (e.g., symbols numbered 0 to 6). The symbols can be encoded using any of a variety of modulation schemes such as, but not limited to, a quadrature phase shift keying (QPSK) scheme or a quadrature amplitude modulation (QAM) scheme, such as 16QAM or 64QAM. The symbols can represent the data to be communicated using system 100.

FIG. 2 also depicts an example resource block 212 including 84 resource elements carried using 12 subcarriers during a single slot duration. The resource elements (represented by one of the 84 small rectangles) can include the symbols modulated onto the subcarriers. A resource block could include a different number of resource elements.

Figure 3:
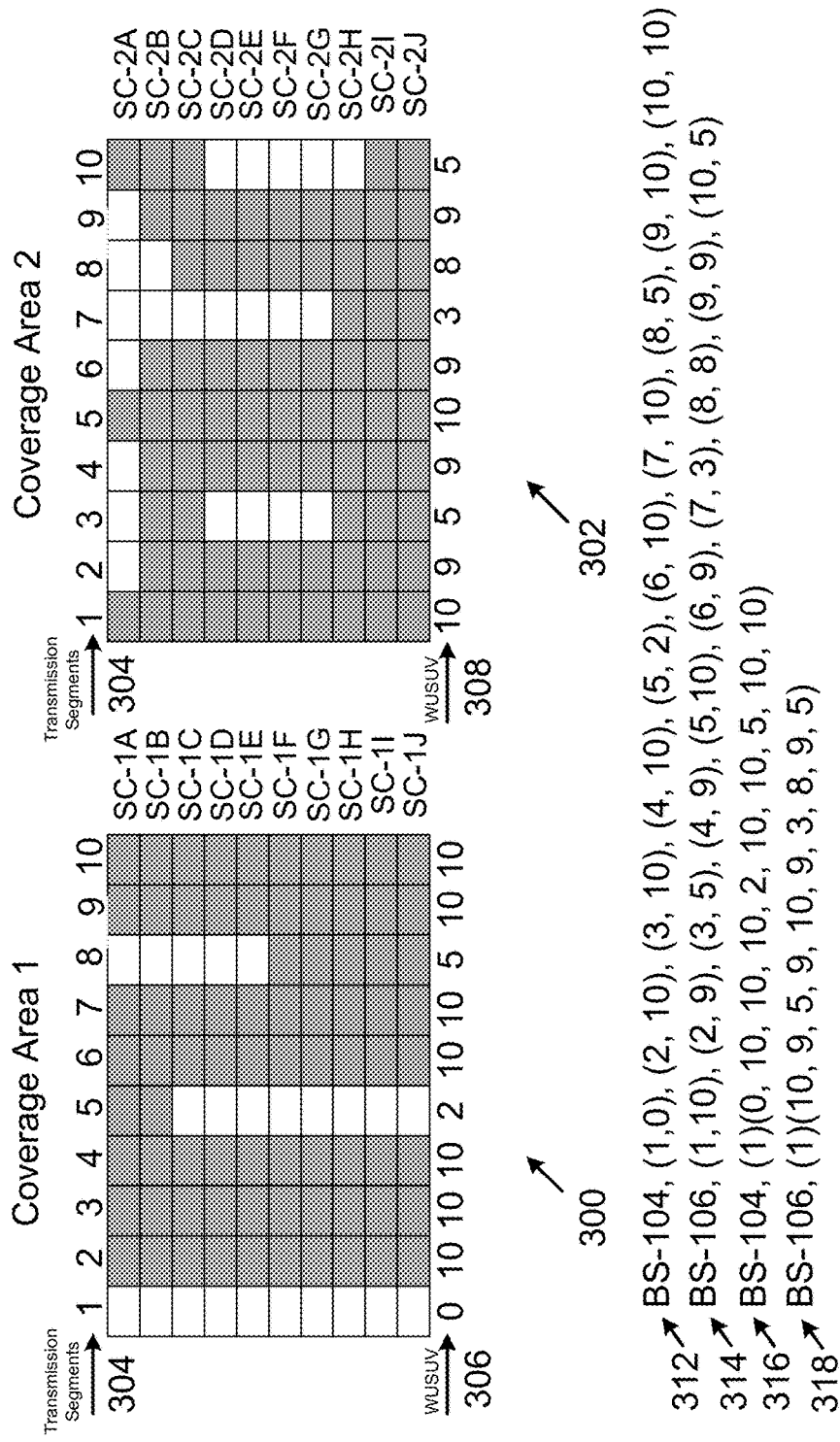
FIG. 3 is a diagram representing use and non-use of RF resources provided within two coverage areas.

Next, FIG. 3 illustrates a diagram 300 representing use and non-use (i.e., availability) of RF uplink resources for a first coverage area (i.e., coverage area 1) provided by a first base station and a diagram 302 representing use and non-use of RF uplink resources for a second coverage area (i.e., coverage area 2) provided by a second base station or by another coverage area (e.g., another sector) of the first base station. For purposes of describing FIG. 3, base station 104 will be the first base station and base station 106 will be the second base station. The use of RF uplink resources for a coverage area can be referred to as a load of that coverage area.

Each row in diagram 300 can represent a set of distinct sub-carriers of base station 104. Those sets of sub-carriers are identified as SC-1A through SC-1J, where the "SC" represents sub-carriers, the "1" represents coverage area 1, and the letters "A" through "J" represent a distinct set of sub-carriers within coverage area 1. Each row in diagram 302 represents a set of distinct sub-carriers of base station 106. Those sets of sub-carriers are identified as SC-2A through SC-2J, where the "SC" represents sub-carriers, the "2" represents coverage area 2, and the letters "A" through "J" represent a distinct set of sub-carriers within coverage area 2.

Each column in diagrams 300 and 302 represents one transmission segment for base stations 104 and 106, respectively. The transmission segments 304 identified for coverage areas 1 and 2 in FIG. 3 are transmission segments 1 through 10. In accordance with the example embodiments, each transmission segment can correspond to a subframe, such as subframe 210, but each transmission segment is not so limited. For instance, each transmission segment could correspond to a frame, such as frame 202, a slot, such as slot 0 of subframe 210, or a symbol, such as symbol #0 of slot 3 of frame 202.

Diagram 300 and diagram 302 each include one hundred rectangles, some of which are white and some of which are gray. For purposes of this description, the gray rectangles represent RF resources used or in use and the white rectangles represent RF resources not used or not in use. As an example, each rectangle can represent a resource block 212 of RF uplink resources such that each column represents one slot of a subframe. As another example, each rectangle can represent two resource blocks occurring over two consecutive slots of a subframe. In accordance with either of those examples or some other example, diagram 300 shows that seventy-seven of the RF resources of base station 104 were used and twenty-three RF resources of base station 104 were not used (i.e., available), and diagram 302 shows that seventy-seven RF resources of base station 106 were used and twenty-three RF uplink resources of base station 106 were not used. In accordance with the example embodiments, the RF resources represented by the rectangles in diagrams 300 and 302 can be RF uplink resources, such as one or more RF uplink resource blocks. The numbers at the bottom of diagrams 300 and 302 indicate the number of gray rectangles in each column (i.e., the number of RF resources used). Those numbers also represent the number of WUSUV for each column. WUSUV 306 correspond to coverage area 1 and WUSUV 308 correspond to coverage area 2.

In accordance with the example embodiments in which each transmission segment shown in FIG. 3 is a sub-frame, assuming each sub-frame has a time duration of 1 ms, then diagrams 300 and 302 each represent a time duration of 10 ms. Diagrams 300 and 302 are merely representative of a portion of the transmission segments that would typically occur during operation of base stations 104 and 106 and UE device 102 and other UE devices. Separate diagrams could be used to represent the additional transmission segments, although the separate diagrams may have some other combination of rectangles shaded to show different use patterns of the RF resources (e.g., sub-carriers) during those additional transmission segments.

WUSUV, such as WUSUV 306 and 308, can be communicated throughout system 100 using messages including message data arranged in any of a variety of configurations. For example, the WUSVU could be communicated by a message with message data including the WUSUV and a corresponding transmission segment identifier for each WUSUV, such as message data 310 and 312. As another example, the WUSVU could be communicated by a message with message data including the WUSUV and a single transmission segment identifier, such as message data 314 and 316. In the latter example, the single transmission identifier can be the earliest transmission segment identifier for the WUSUV, but is not so limited.

Figure 4:
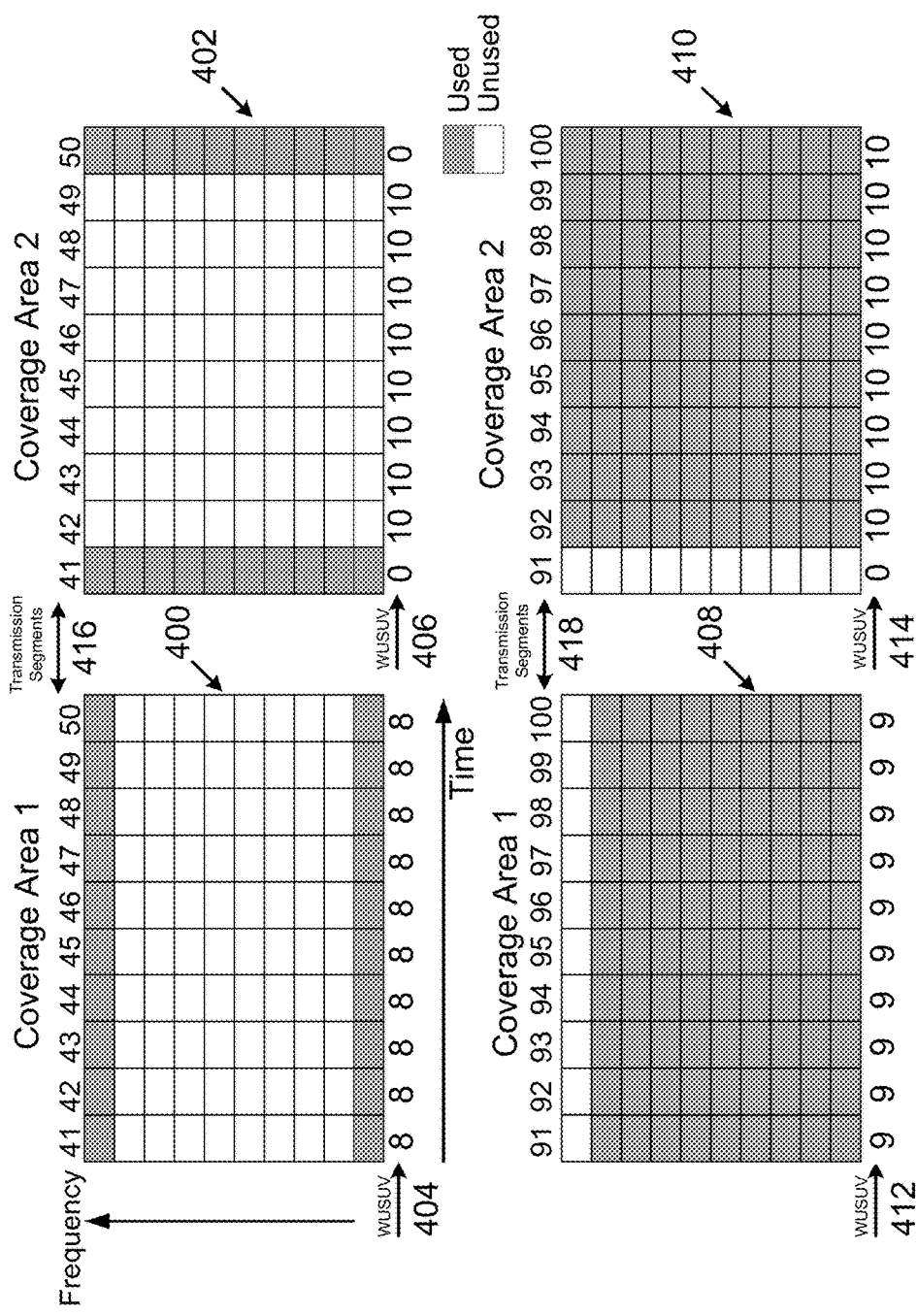
FIG. 4 is a diagram representing use and non-use of RF resources provided within two coverage areas.

Next, FIG. 4 illustrates diagrams 400 and 408 representing use and non-use of RF resources (e.g., RF uplink resources) for coverage area 1 provided by a first base station (e.g., base station 104) and diagrams 402 and 410 representing use and non-use of RF resources (e.g., RF uplink resources) for coverage area 2 provided by a second base station (e.g., base station 106) or by another coverage area of the first base station. Diagrams 400 and 402 pertain to transmission segments 41 through 50, whereas diagrams 408 and 410 pertain to transmission segments 91 through 100. WUSUV 404, 406, 412, and 414 are shown for diagrams 400, 402, 408, and 410, respectively.

Unlike the downlink in which transmission power is typically not an issue and a pattern of using downlink RF resources may not impact user throughput, for the uplink, transmission power is an important consideration for UE devices, especially UE devices operating near the edge of a cell. A use pattern of the RF resources available to the UE device can impact performance of the UE device. Therefore, considering the use pattern when selecting or assigning RF resources may be beneficial for improving performance of a UE device operating near the edge of a cell. The load metrics described herein can be indicative of a use pattern and thus considered when selecting or assigning RF resources. The load metrics can also be used when selecting or assigning RF resources for a UE device operating away from the edge of a cell as the load metrics are not limited to selecting or assigning RF resources to UE devices operating near (i.e., within) the edge of the cell or coverage area.

The rows and columns of diagrams 400 and 402 represent the same information as the rows and columns of diagrams 300 and 302, respectively, although different combinations of WUSUV are shown in diagrams 300, 302, 400 and 402 and different transmission segments are identified. Similarly, the rows and columns of diagrams 408 and 410 represent the same information as the rows and columns of diagrams 300 and 302, respectively, although different combinations of WUSUV are shown in diagrams 300, 302, 408 and 410 and different transmission segments are identified. The frequency and time reference lines shown with respect to diagram 400 are applicable to the axis of diagrams 300, 302, 402, 408 and 410.

Diagrams 400 and 402 represent an equivalent average use (i.e., 20 percent) of RF resources over the time and frequency represented by those diagrams, but with a different pattern of use. Each of the 100 rectangles in diagrams 400 and 402 can represent one resource block. In one respect, a pattern of use such as the pattern of use shown in diagram 400 would allow for assigning at least one additional resource block in each of the ten transmission segments, but the pattern of use in diagram 402 would allow for assigning at least one additional resource block in only eight of the ten transmission segments. In another respect, a pattern of use, such as the pattern of use shown in diagram 402 would allow for assigning ten additional resource blocks during a given transmission segment in eight of the ten transmission segments, but the pattern of use in diagram 400 would not allow for assigning ten additional resource blocks in any transmission segment.

Diagrams 408 and 410 represent an equivalent average use (i.e., 90 percent) of RF resources over the time and frequency represented by those diagrams, but with a different pattern of use. Each of the 100 rectangles in diagrams 408 and 410 can represent one resource block. In one respect, a pattern of use such as the pattern of use shown in diagram 408 would allow for assigning one additional resource block in each of the ten transmission segments, but the pattern of use in diagram 402 would allow for assigning one additional resource block in only one of the ten transmission segments. In another respect, a pattern of use such as the pattern of use shown in diagram 408 would not allow for assigning ten additional resource blocks in any of the ten transmission segment, but the pattern of use in diagram 410 would allow for assigning ten additional resource blocks in one transmission segment.

The patterns of using RF resources during prior transmission segments can be indicative of patterns of using RF resources during future transmission segments and can be compared to application requirements for basing a decision to select or assign RF resources.

A pattern of use shown in diagram 408 can be desirable for UE devices operating in the edge of a coverage area as those UE devices may have less uplink transmission power headroom. The pattern of use shown in diagram 408 can compensate for low data rate and low instantaneous transmission power by providing continuous transmission opportunities.

A pattern of use shown in diagram 410 can be desirable for UE devices close to the base station (in a non-edge portion away from the edge of a coverage area provided by that base station) as those UE devices may have a greater uplink transmission power headroom. The pattern of use shown in diagram 410 can allow UE devices to quickly transmit their data packets in short busts (e.g., over fewer transmission segments).

Figure 5:
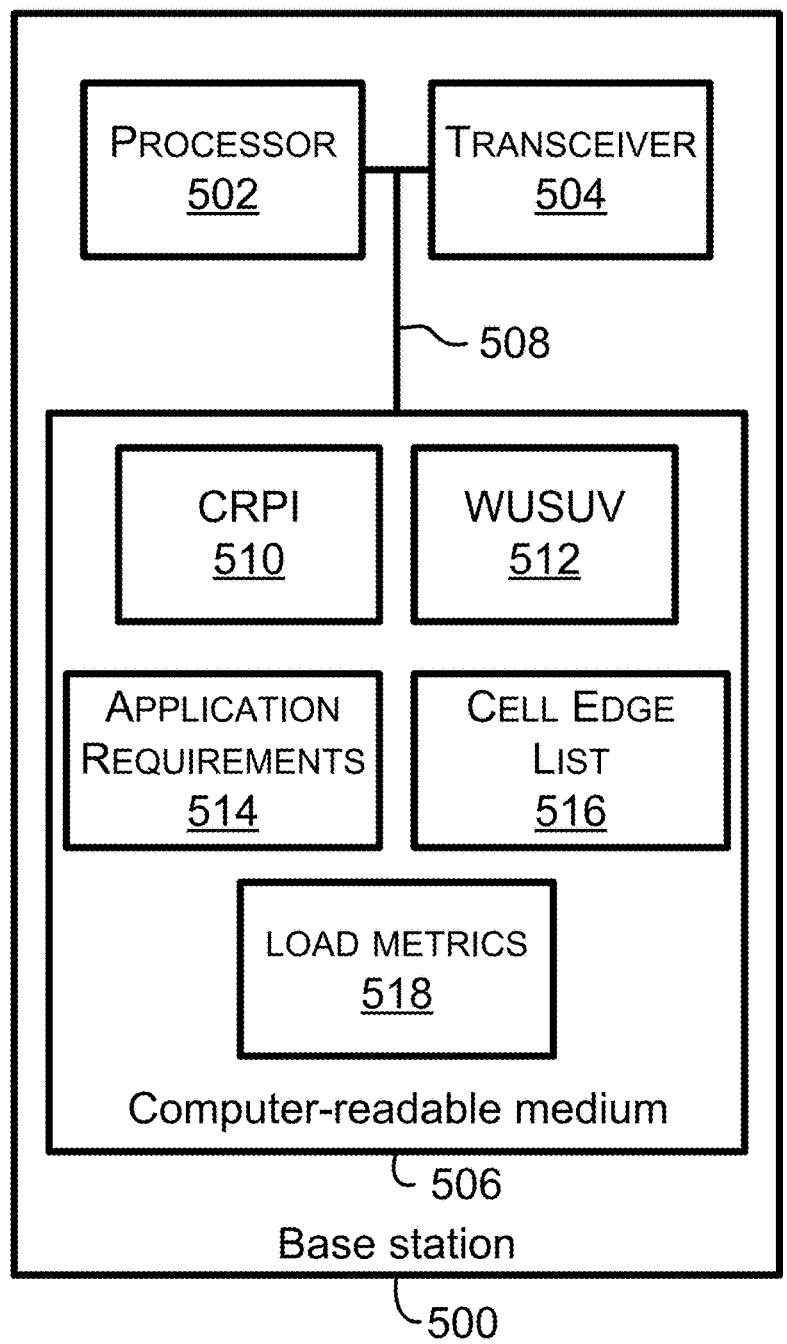
FIG. 5 is a simplified block diagram of a base station in accordance with the example embodiments described herein.

Next, FIG. 5 is a block diagram of a base station 500 in accordance with one or more of the example embodiments described herein. Base station 500 includes a processor 502, a transceiver 504, and a computer-readable medium 506, all of which can be linked together via a system bus, network, or other connection mechanism 508. One or more base stations of communication system 100, such as one or more of base stations 104, 106, and 108, can include the same elements as base station 500. Accordingly, base stations 104, 106, 108 and 500 can use the OFDMA protocol. A base station that uses the OFDMA protocol can include, but not limited to, an eNode-B, a Wi-MAX base station, or an MBWA base station.

A processor, such as processor 502 or any other processor disclosed herein, can include one or more general purpose processors (e.g., INTEL single core microprocessors or INTEL multicore microprocessors) or one or more special purpose processors (e.g., application specific integrated circuits (ASICs) or digital signal processors (DSPs)). Each processor disclosed herein can execute computer-readable program instructions (CRPI) stored within a computer-readable medium. For example, processor 502 can execute CRPI 510 stored within computer-readable medium 506.

Transceiver 504 can include a transmitter (e.g., one or more transmitters) and a receiver (e.g., one or more receivers). A transmitter of transceiver 504 can include a first transmitter to wirelessly transmit data over an RF downlink of a communication link of system 100 (e.g., one of communication links 116, 118, and 120). As an example, the transmitter of transceiver 504 can transmit WUSUV to one more UE devices or one or more base stations using a MIB, a SIB, or some other message or signal carrying the WUSUV (e.g., WUSUV 310, 312, 314, or 316). A transmitter of transceiver 504 can include a second transmitter to transmit data to other elements of system 100, such as another base station or core network 112. The second transmitter can transmit the data over a wired or wireless communication link. One or more of the first and second transmitters can be configured as or include a multiple-input and multiple-output (MIMO) transmitter, a diversity transmitter, or a multi-channel transmitter, but are not so limited. A transmitter of transceiver 504 can include one or more transmitting antennas.

A receiver of transceiver 504 can include a first receiver to receive data wirelessly transmitted over an RF uplink of a communication link of system 100 (e.g., one of communication links 116, 118, and 120). A receiver of transceiver 504 can include a second receiver to receive data from other elements of system 100, such as another base station or core network 112. As an example, the receiver of transceiver 504 can receive WUSUV transmitted by another base station using a MIB, a SIB, or some other message or signal carrying the WUSUV. The second receiver can receive the data over a wired or wireless communication link. One or more of the first and second receivers can be configured as or include a MIMO receiver, a diversity receiver, or a multi-channel receiver, but are not so limited. A receiver of transceiver 504 can include one or more receiving antennas.

A computer-readable medium, such as computer-readable medium 506 or any other computer-readable medium disclosed herein, can include a non-transitory computer-readable medium readable by a processor. A computer-readable medium can comprise volatile and/or non-volatile storage components, such as optical, magnetic, organic or other memory or disc storage, which can be integrated in whole or in part with a processor. A computer-readable medium, such as computer-readable medium 506, or a portion thereof, can also or alternatively be provided as a separate non-transitory machine readable medium distinct from a processor, such as processor 502. A computer-readable medium can be referred to by other terms such as, but not limited to, a "computer-readable storage medium," a "data storage device," a "memory device," or a "memory."

Additionally or alternatively, a computer-readable medium, such as computer-readable medium 506 or any other computer-readable medium disclosed herein, can include a transitory computer-readable medium. The transitory computer-readable medium can include, but is not limited to, a communications medium such as a digital or analog communications medium (e.g., a fiber optic cable, a waveguide, a wired communication link, or a wireless communication link).

Computer-readable medium 506 can include WUSUV 512. As an example, WUSUV 512 can include a number of WUSUV, where the number of WUSUV equals 20, 50, 100, or 200 WUSUV or some other number of WUSUV. Computer-readable medium 506 can store WUSUV 512 using a first-stored, first-overwritten, process, but is not so limited.

Any WUSUV can include or correspond to a transmission segment identifier. A transmission segment identifier for one or more WUSUV can be implied by an order in which the WUSUV is stored by a computer-readable medium (e.g., a sequential order of data addresses within computer-readable medium 506 can indicate the order in which the WUSUV were stored). As an example, a transmission segment identifier can identify a time the use or non-use of the uplink RF resource occurred. The time can be specified by a coordinated universal time (UTC), but is not so limited. As another example, a transmission segment identifier can identify a sequence identifier, such as a sequence number indicating when a WUSUV was determined or received. Numbers 1 to 10 in FIG. 3 and numbers 41 to 50 and 91 to 100 are examples of the sequence numbers.

A processor (e.g., processor 502 or processor 602 (shown in FIG. 6)) can use the transmission segment identifier(s) to determine a subset (e.g., one or more subsets) of WUSUV that pertain to a particular base station for a particular time period (i.e., a window) (e.g., a subset of WUSUV pertaining to base station 104 and a first time period or a subset of WUSUV pertaining to base station 106 and to the first time period). The time period can indicate when the WUSUV within that subset was received or determined. The time period for each subset of WUSUV can be equal to the time of one frame duration, but is not so limited. The time period can equal a number of transmission segments such as, but not limited to, ten transmission segments.

If the particular base station provides a single coverage area, the WUSUV that pertain to the particular base station can also pertain to the RF uplink of that coverage area. If the particular base station provides more than one coverage area, the WUSUV that pertain to the particular base station can also pertain to a particular coverage area of the particular base station and an RF uplink of the particular coverage area.

A subset of WUSUV can include the latest (e.g., the most recently received or determined) WUSUV that pertain to a particular base station or RF uplink of the particular base station. The latest WUSUV may provide a best prediction for future use of the RF uplink to which the WUSUV pertain. As an example, a processor can determine a current time and a number of the latest WUSUV corresponding to transmission segment identifiers that indicate times immediately prior to the current time. As another example, a processor can determine a transmission segment identifier that indicates the latest sequence identifier assigned to a WUSUV and a number of the latest WUSUV corresponding to the latest sequence identifier.

Turning to the CRPI, CRPI 510, in general, can include program instructions, that when executed by processor 502, cause a set of functions to be performed. As an example, the set of functions performed by execution of CRPI 510 can include any function disclosed herein as being performed by processor 502, transceiver 504, computer-readable medium 506, or system bus, network, or other connection mechanism 508. As another example, the set of functions performed by execution of CRPI 510 can include any function performed by a base station. As another example, the set of functions performed by execution of CRPI 510 can include one or more of the functions of the set 700 and the set 800 described below with respect to FIG. 7 and FIG. 8, respectively. Other examples of the set of functions performed by execution of CRPI 510 are also possible.

As another example, CPRI 510 can include program instructions to determine a count of WUSUV for a transmission segment. Those program instructions can be referred to as "count WUSUV CPRI." Execution of the count WUSUV CPRI can include a processor determining how many resource blocks were assigned by base station 500 for a transmission segment. Additionally or alternatively, execution of the count WUSUV CPRI can include a processor determining how many resource blocks carried data to the base station during the transmission segment. Execution of the count WUSUV CRPI can lead to determining WUSUV 306, 308, 404, 406, 412, and 414.

As another example, CRPI 510 can include program instructions to determine multiple WUSUV from among WUSUV 512. Those program instructions can be referred to as "WUSUV determination CRPI." The quantity of WUSUV determined by execution of the WUSUV determination CRPI can equal a predetermined number of WUSUV, such as $P_{WUSUV}$, where $P_{WUSUV}=10$ or some other number of WUSUV greater than 1. As an example, when $P_{WUSUV}=10$, the multiple WUSUV can include WUSUV 306 corresponding to transmission segments 304. The WUSUV determination CPRI can be configured such that the use values correspond to a transmission segment other than a subframe, such as a frame or slot.

The multiple WUSUV can be determined for use in determining a load metric corresponding to an RF uplink. Determining the multiple WUSUV can include processor 502 determining WUSUV that pertain to a particular base station (e.g., a first base station), a particular time period (e.g., a first time period corresponding to frame duration 204), and a particular set of sub-carriers (e.g., SC-1A through SC-1J). The particular time period is not so limited though as it could pertain to some portion of frame duration 204 or plus at least a portion of one or more other frame durations.

As another example, CRPI 510 can include program instructions to determine an average (i.e., an arithmetic mean) of multiple WUSUV. Those program instructions can be referred to as "average determination CRPI" or "mean determination CRPI." The multiple WUSUV from which the average is determined can include the WUSUV determined by execution of the WUSUV determination CRPI. The average determination CPRI can be executed to determine the average using equation (1).

$$\text{Average} = (\Sigma X)/n, \quad (1)$$

where $\Sigma$=sum of, X=the individual WUSUV of the multiple WUSUV, and n=sample size (the quantity of WUSUV within the multiple WUSUV). Processor 502 can execute the average determination CPRI in response to each time processor 502 executes the WUSUV determination CRPI to determine multiple WUSUV. Using equation (1), the averages of WUSUV 306, 308, 404, 406, 412, and 414 are 7.7, 7.7, 8.0, 8.0, 9.0, and 9.0, respectively. A low average of the WUSUV can indicate the base station has a greater amount of RF resources available.

Additionally, CRPI 510 can include program instructions to determine a variance of multiple WUSUV. Those program instructions can be referred to as "variance determination CRPI." The multiple WUSUV from which the variance is determined can include the WUSUV determined by execution of the WUSUV determination CRPI. The variance determination CRPI can be executed to use an equation to calculate a variance of multiple WUSUV ($X_1$ to $X_n$) such as, but not limited to, equation (2) or (3).

$$\text{Variance} = (\Sigma(X-X_M)^2)/n; \text{ or} \quad (2)$$

$$\text{Variance} = (\Sigma(X-X_M)^2)/(n-1), \quad (3)$$

where $\Sigma$=sum of, X=the individual WUSUV of the multiple WUSUV, $X_M$=the average of the multiple WUSUV, and n=sample size (the quantity of WUSUV within the multiple WUSUV). Processor 502 can execute the variance determination CPRI in response to each time processor 502 executes the WUSUV determination CRPI to determine multiple WUSUV. Using equation (2), the variances of WUSUV 306, 308, 404, 406, 412, and 414 are 13.61, 5.41, 0.0, 16.0, 0.0, and 9.0, respectively. Using equation (3), the variances of WUSUV 306, 308, 404, 406, 412, and 414 are 15.1, 6.0, 0.0, 17.8, 0.0, and 10.0, respectively. A low variance of the WUSUV can indicate a uniform distribution (i.e., less peaks).

As another example, CRPI 510 can include program instructions to determine a load metric based on, at least in part, a variance of multiple WUSUV and an average of the multiple WUSUV. Those program instructions can be referred to as "load metric determination CRPI." As an example, execution of the load metric determination CRPI can be executed to use an equation to calculate the load metric such as, but not limited to, equation (4).

$$\text{Load metric} = (\text{Average of WUSUV}_{SET}) \times (\text{Variance of WUSUV}_{SET}), \quad (4)$$

where $\text{WUSUV}_{SET}$=a predetermined number of WUSUV pertaining to a base station and time period. As an example, for the ten WUSUV of WUSUV 306 corresponding to a time period in which transmission segments 304 occurred, the load metric equals 7.7 times 13.61 (i.e., 104.79). As another example, for the ten WUSUV of WUSUV 308 corresponding to a time period in which transmission segments 304 occurred, the load metric equals 7.7 times 5.41 (i.e., 41.65). Computer-readable medium 506 can store load metric (e.g., load metrics determined by processor 502 or received by transceiver 504) within load metrics 518.

As yet another example, CRPI 510 can include program instructions to select a coverage area (or base station) based on, at least in part, the load metric pertaining to those coverage areas. Those program instructions can be referred to as "coverage area selection CRPI." Execution of the coverage area selection CRPI can include a processor determining whether UE device 102 is operating at a cell edge of a coverage area provide by base station 104 or base station 106 and selecting whichever of those base stations is associated with a smaller load metric. Determining whether UE device 102 is operating at a cell edge of a coverage area can include, but is not limited to, comparing a location of the UE device to locations within the coverage area predetermined to be a part of the cell edge. If the processor considers the load metrics corresponding to base stations 104 and 106 for transmission segments 304, then the processor would select base station 106 as the load metric corresponding to that base station is 41.65, whereas the load metric for base station 104 for transmission segments 304 is 104.79. Selecting a base station with the smaller load metric can result in selecting the base station that provides the maximum uplink transmission opportunities in the time domain for the base station in proximity to the UE device.

As yet another example, CRPI 510 can include program instructions to transmit WUSUV data, transmission segment identifier(s), WUSUV averages, WUSUV variances, or WUSVU load metrics to another device (e.g., another base station or to a UE device) as described herein. Those program instructions can be referred to as "transmission CRPI." Execution of the transmission CRPI can include generating a message including the message to be transmitted, providing the message to a transmitter, and transmitting the message. Execution of the transmission CRPI can include receiving a message with the WUSUV data, transmission segment identifier(s), WUSUV averages, WUSUV variances, or WUSVU load metrics from another device.

Computer-readable medium 506 can also include application requirements 514. Application requirements 514 can include an identifier of UE device 102 (or one or more other UE devices) and an identifier of an application executing on UE device 102 (or the one or more other UE devices) or an application requirement corresponding to the application executing on UE device 102 (or the one or more other UE devices). For example, the application requirements may be defined as a number of uplink resource blocks (RBs) needed to maintain a required data rate for the application executing on UE device 102.

Computer-readable medium 506 can also include a cell edge list 516 including data that indicates which UE devices operating within the coverage area provided by base station 500 are within an area defined as a cell edge for the coverage area provided by base station 500. Processor 502 can execute CRPI 510 to determine a location of each UE device connected to or camping on base station 500, and to compare the determined location to the area defined as the cell edge so as to determine whether the UE device is operating within the cell edge area. Processor 502 can modify cell edge list 516 to include any UE device recently determined to be operating within the cell edge and to remove any UE device listed in the cell edge list 516, but no longer operating within the cell edge.

Figure 6:
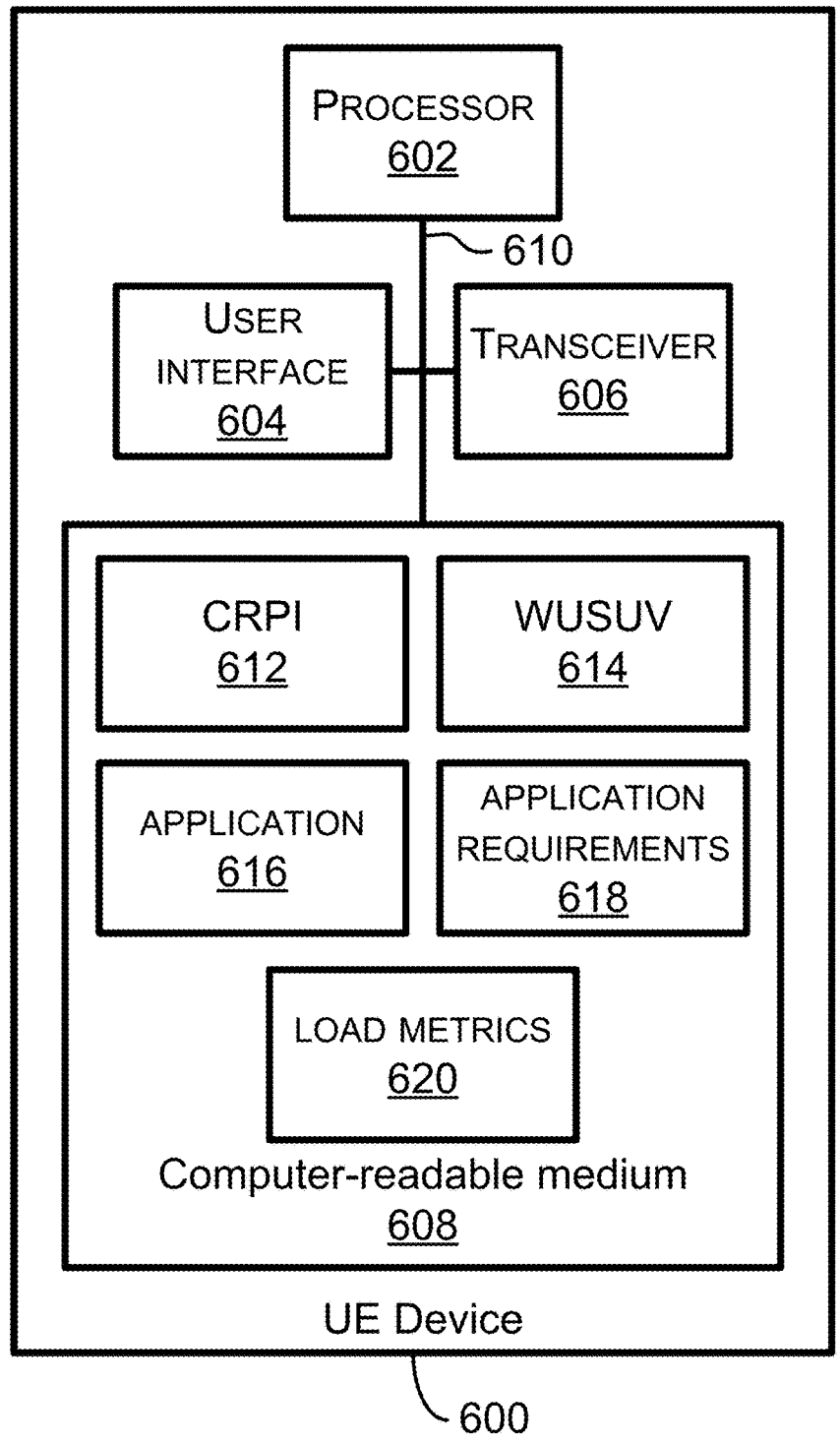
FIG. 6 is a simplified block diagram of a UE device in accordance with the example embodiments described herein.

Next, FIG. 6 is a block diagram of a UE device 600 in accordance with one or more of the example embodiments disclosed herein. UE device 600 includes a processor 602, a user interface 604, a transceiver 606, and a computer-readable medium 608, all of which can be linked together via a system bus, network, or other connection mechanism 610. One or more UE devices operable within communication system 100, such as UE device 102, can include any of the elements of UE device 600. Processor 602 can execute CRPI 612 stored within computer-readable medium 608.

User interface 604 can include an input element for a user to enter data (e.g., a user selection) into UE device 600. The input element of user interface 604 can include, but is not limited to, one or more switches (e.g., keys of a keypad) to input. The input element can be used to enter a telephone number to be dialed or a uniform resource locator (URL) of a website on the World Wide Web. The input element can include an element to initiate dialing of the telephone number or to initiate a browser to request data from the URL. The input element can include an application selection element to select and initiate execution of an application stored within application 616. The input element can include a microphone that converts sounds into electrical signals for transmission during a phone call. Other examples of the input element portion of user interface 604 are also possible.

User interface 604 can include an output element for outputting data to a user. The output element of user interface 604 can include, but is not limited to, a display to output data visually and a loudspeaker to output data audibly. The display can include a touch screen display that also functions as input element of user interface 604. The output element can output data generated by execution of an application stored within application 616.

Transceiver 606 can include a transmitter (e.g., one or more transmitters) and a receiver (e.g., one or more receivers). A transmitter of transceiver 606 can include a transmitter to wirelessly transmit data over an RF uplink of a communication link of system 100 (e.g., one of communication links 116, 118, and 120). A transmitter of transceiver 606 can be configured as or include a MIMO transmitter, a diversity transmitter, or a multi-channel transmitter, but is not so limited. A transmitter of transceiver 606 can include one or more transmitting antennas.

A receiver of transceiver 606 can include a receiver to receive data wirelessly transmitted over an RF downlink of a communication link of system 100 (e.g., one of communication links 116, 118, and 120). A receiver of transceiver 606 can include one or more receiving antennas. As an example, the receiver of transceiver 606 can receive, from a base station, WUSUV or a MIB, a SIB, or some other message or signal carrying the WUSUV. A receiver of transceiver 606 can be configured as or include a MIMO receiver, a diversity receiver, or a multi-channel receiver, but is not so limited. A receiver of transceiver 606 can include one or more receiving antennas.

Computer-readable medium 608 can include CRPI 612, WUSUV 614, application 616, application requirements 618, and load metrics 620. WUSUV 614 can include a number of WUSUV, where the number of WUSUV equals 20, 50, 100, or 200 WUSUV or some other number of WUSUV. Computer-readable medium 608 can store WUSUV 614 using a first-stored, first-overwritten, process, but is not so limited. Similar to WUSUV 512, one or more WUSUV of WUSUV 614 can include or correspond to a transmission segment identifier. Computer-readable medium 608 can store a load metric (e.g., one or more load metrics determined by processor 602 or received by transceiver 604) within load metrics 620.

Application 616 (i.e., one or more applications) can include an application to carry out any of a variety of features, such as an application for browsing the Internet, an application for viewing video content streaming to UE device 600 over a communication link, or an application for playing audio content streaming to UE device 600 over the communication link. An application stored within application 616 can be downloaded from an application store, such as the GOOGLE PLAY® or ITUNES STORE®.

Application requirements 618 can indicate an amount of RF resources required to execute an application within application 616. As an example, an application may require ten RF uplink resource blocks during a given time period. Other applications may require a different amount of RF uplink resource blocks or a different time period for ten RF uplink resource blocks. Application requirements 618 can be included within application 616.

In general, CRPI 612 can include program instructions, that when executed by processor 602, cause a set of functions to be performed. As an example, the set of functions performed by execution of CRPI 612 can include any function disclosed herein as being performed by processor 602, user interface 604, transceiver 606, computer-readable medium 608, or system bus, network, or other connection mechanism 610. As another example, the set of functions performed by execution of CRPI 612 can include any function performed by a UE device. As yet another example, the set of functions performed by execution of CRPI 612 can include one or more of the functions of the set 700 and the set 800 described below with respect to FIG. 7 and FIG. 8, respectively. Other examples of the set of functions performed by execution of CRPI 612 are also possible.

CRPI 612 can include any of the count WUSUV CRPI, WUSUV determination CRPI, average determination CRPI, variance determination CRPI, load metric determination CRPI, coverage area selection CRPI, and transmission CRPI, as described above with respect to CRPI 510.

IV. Example Operation

Figure 7:
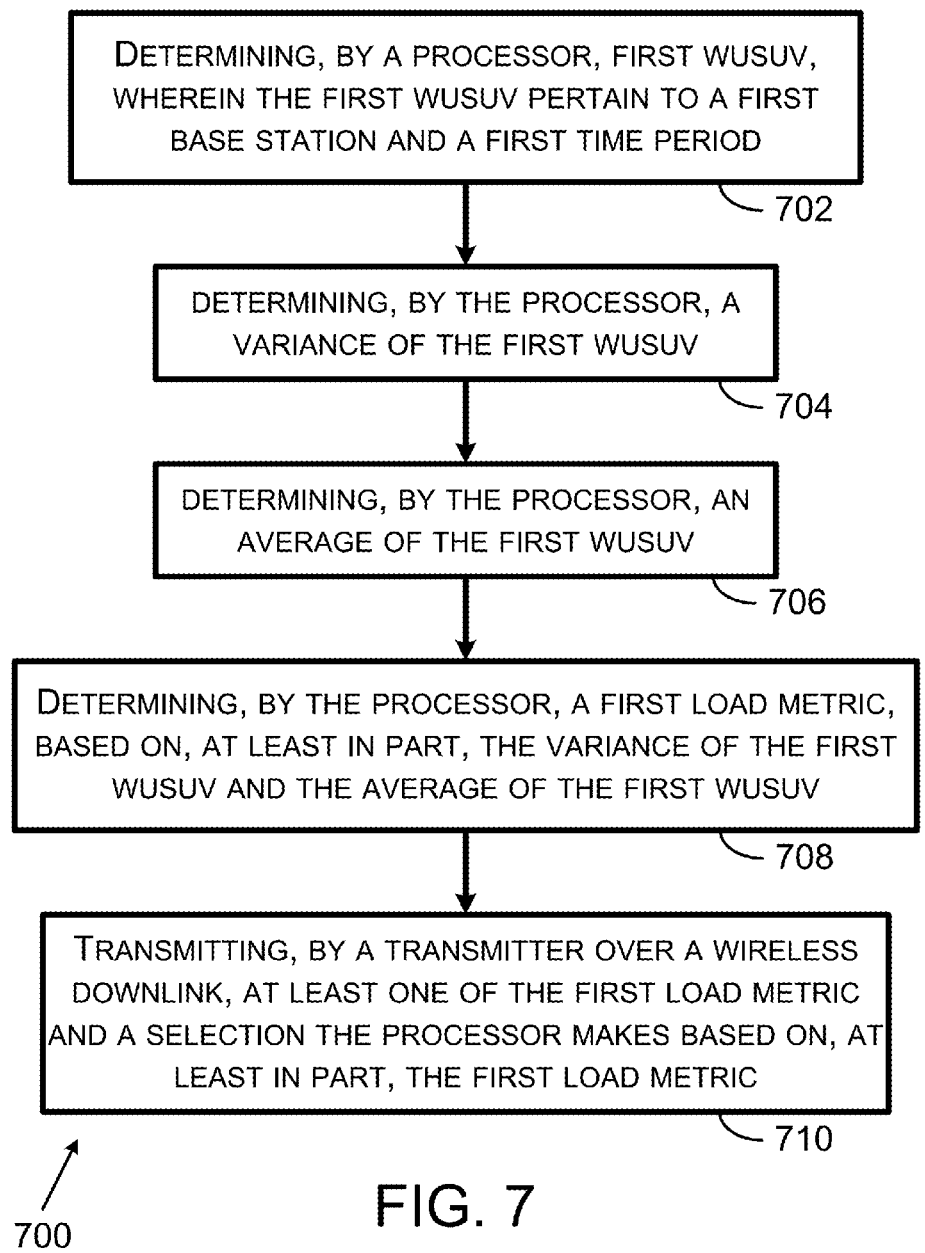
FIG. 7 is a flowchart depicting a set of functions that can be carried out in accordance with the example embodiments described herein.

FIG. 7 depicts a flowchart showing a set of functions (e.g., operations) 700 (or more simply, "the set 700") that can be carried out in accordance with the example embodiments disclosed herein. The functions of the set 700 are shown within blocks labeled with even integers between 702 and 710, inclusive. The functions of the set 700 refer to a first base station. With regard to the set 700, this description refers to the first base station as base station 104. The first base station (e.g., base station 104) can be configured like or include base station 500, but is not so limited. The performance of any function described herein with respect to a function of the set 700 can include a processor, such as processor 502 or 602, executing program instructions, such as CRPI 510 or 612, respectively, to perform at least a portion of the function.

Other function(s) disclosed in this description can be performed prior to, while, or after performing any one or more of the functions of the set 700. Those other function(s) can be performed in combination with or separately from any one or more of the functions of the set 700.

Block 702 includes determining, by a processor, first WUSUV, wherein the first WUSUV pertain to a first base station (e.g., base station 104) and a first time period (e.g., a time period corresponding to transmission segments 304). The first WUSUV can include a number of WUSUV equal to $P_{WUSUV}$.

In a first respect, the first WUSUV can be determined by a processor (e.g., processor 502) within the first base station (e.g., base station 104). A receiver of transceiver 504 can receive data transmitted over the RF uplink resources of a coverage area provided by base station 104. Processor 502 can execute the WUSUV determination CRPI to determine which RF uplink resources are used for each transmission segment and determine a count of the number of RF uplink resources used for each transmission segment. For transmission segment 304, that count is shown as WUSUV 306 for the sets of sub-carriers SC-1A through SC-1J, and as WUSUV 308 for the sets of sub-carriers for the sets of sub-carriers SC-2A through SC-2J. The first WUSUV can be stored within WUSUV 512.

In a second respect, the first WUSUV can be determined by a processor (e.g., processor 602) within a UE device (e.g., UE device 102). A base station (e.g., base station 104) can transmit a message (e.g., a MIB or SIB) including the first WUSUV. A receiver of transceiver 606 can receive the message including the first WUSUV and provide the message or the first WUSUV to processor 602 or computer-readable medium 608 using system bus, network, or other connection mechanism 610. The first WUSUV can be stored within WUSUV 614. Processor 602 can execute the WUSUV determination CRPI to determine the first WUSUV from among WUSUV stored within WUSUV 614.

A processor can execute the WUSUV determination CRPI multiple times to determine additional sets of WUSUV that pertain to the first base station for the first time period and other sub-carriers or one or more additional sets of WUSUV that pertain to the first base station for one or more other time periods and the same sub-carriers corresponding to the first WUSUV or the other sub-carriers.

Next, block 704 includes determining, by the processor, a variance of the first WUSUV. In a first respect, the variance can be determined by a processor (e.g., processor 502) within the first base station (e.g., base station 104). In a second respect, the variance can be determined by a processor (e.g., processor 602) within a UE device (e.g., UE device 102). In accordance with either or both those respects, the processor can execute the variance determination CRPI to determine the variance at block 704. Moreover, a processor that determines the first WUSUV can determine a variance for any other set of WUSUV the processor determines using the WUSUV determination CRPI or otherwise. The variances determined by processor 602 can be stored with computer-readable medium 608.

Next, block 706 includes determining, by the processor, an average of the first WUSUV. In a first respect, the average can be determined by a processor (e.g., processor 502) within the first base station (e.g., base station 104). In a second respect, the average can be determined by a processor (e.g., processor 602) within a UE device (e.g., UE device 102). In accordance with either or both those respects, the processor can execute the average determination CRPI to determine the average at block 706. Moreover, a processor that determines the first WUSUV can determine an average for any other set of WUSUV the processor determines using the WUSUV determination CRPI or otherwise. The averages determined by processor 602 can be stored with computer-readable medium 608.

Next, block 708 includes determining, by the processor, a first load metric, based on, as least in part, the variance of the first WUSUV and the average of the first WUSUV. In a first respect, the load metric can be determined by a processor (e.g., processor 502) within the first base station (e.g., base station 104). In a second respect, the load metric can be determined by a processor (e.g., processor 602) within a UE device (e.g., UE device 102). In accordance with either or both those respects, the processor can execute the load metric determination CRPI to determine the load metric at block 706. Moreover, a processor that determines the first load metric can determine a load metric for any other variance and corresponding average the processor determines using the variance determination CRPI and the average determination CRPI, respectively, or otherwise. The load metrics determined by processors 502 and 602 can be stored with load metrics 518 and 620, respectively.

Next, block 710 includes transmitting, by a transmitter over a wireless downlink, at least one of the first load metric and a selection the processor makes based on, at least in part, the first load metric. In a first respect, the first load metric or the selection can be transmitted by a transmitter (e.g., a transmitter of transceiver 504) within the first base station (e.g., base station 104). In a second respect, the first load metric or the selection can be transmitted by a transmitter (e.g., a transmitter of transceiver 606) within a UE device (e.g., UE device 102). In accordance with either or both those respects, a processor can execute the coverage area selection CRPI to make the selection at block 706. Transmitting the first load metric and other determined load metrics, by the first base station or the UE device, can occur periodically, where the period between transmissions can be substantially equal to the first time period.

The descriptions of blocks 702 through 710 refer to a first respect in which a base station carries out at least portion of each of the blocks and to a second respect in which a UE device carries out at least portion of each of the blocks. The example embodiments are not limited to performing the functions of the set 700 corresponding to only one of the first respects and the second respects described above.

Figure 8:
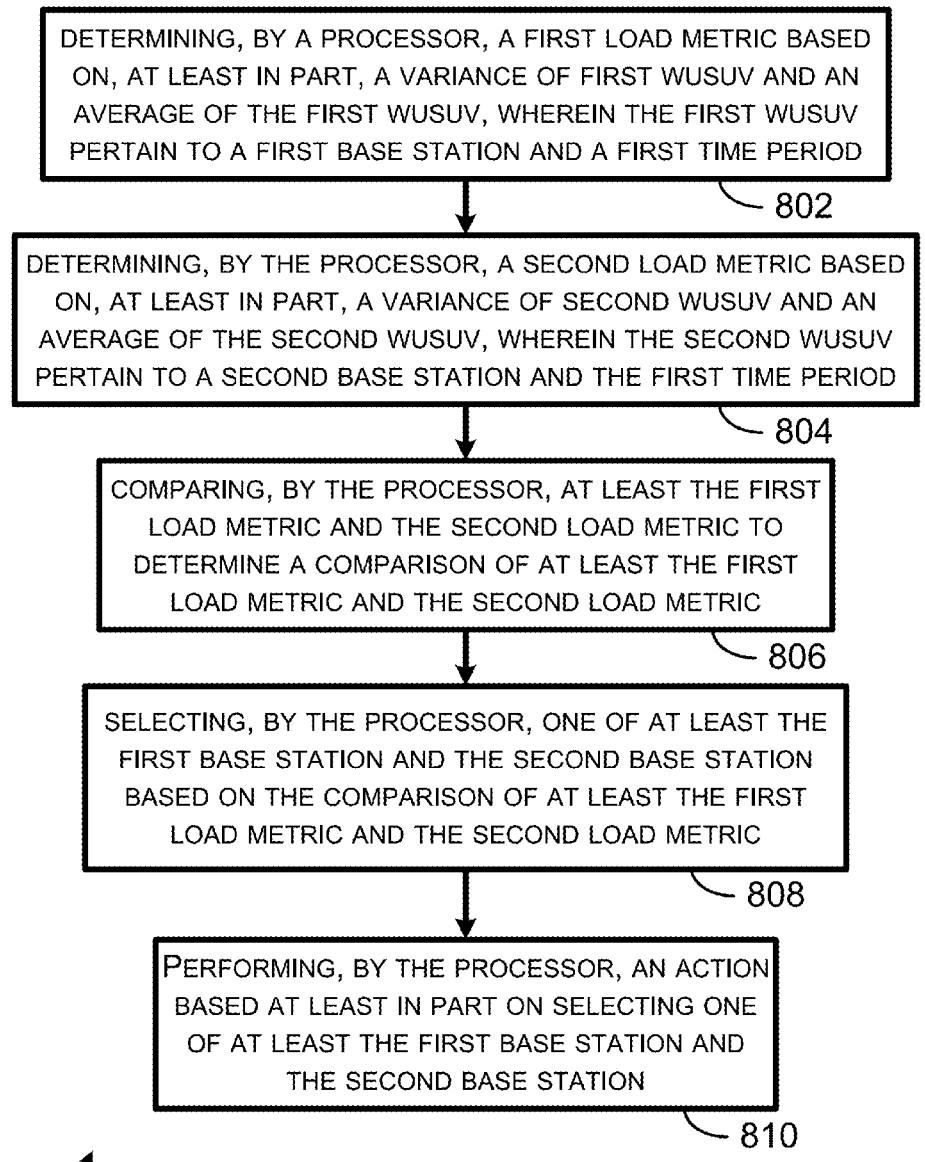
FIG. 8 is a flowchart depicting another set of functions that can be carried out in accordance with the example embodiments described herein.

Next, FIG. 8 depicts a flowchart showing a set of functions (e.g., operations) 800 (or more simply, "the set 800") that can be carried out in accordance with the example embodiments disclosed herein. The functions of the set 800 are shown within blocks labeled with even integers between 802 and 810, inclusive. The functions of the set 800 refer to a first base station and a second base station. With regard to the set 800, this description refers to the first base station as base station 104 and the second base station as base station 106. The performance of any function described herein with respect to a function of the set 800 can include a processor, such as processor 502 or 602, executing program instructions, such as CRPI 510 or 612, respectively, to perform at least a portion of the function.

Other function(s) disclosed in this description can be performed prior to, while, or after performing any one or more of the functions of the set 800. Those other function(s) can be performed in combination with or separately from any one or more of the functions of the set 800.

Block 802 includes determining, by a processor, a first load metric based on, at least in part, a variance of first WUSUV and an average of the first WUSUV, wherein the first WUSUV pertain to a first base station and a first time period. The first WUSUV can include a number of WUSUV equal to $P_{WUSUV}$. The first base station can be a base station that UE device 102 is connected to or camped on in the idle mode or a target base station for handing over UE device 102.

In a first respect, the first load metric can be determined by a processor (e.g., processor 502) within the first base station (e.g., base station 104). For example, processor 502 can determine the first load metric by executing the load metric determination CRPI (as described above with respect to block 708). In accordance with this first respect, the first load metric can be stored within load metrics 518.

In a second respect, the first load metric can be determined by a processor (e.g., processor 602) within a UE device (e.g., UE device 102). A base station (e.g., base station 104) can transmit a message (e.g., a MIB or SIB) including the first load metric or data to determine the first load metric (e.g., the first WUSUV or an average and a variance of the first WUSUV). A receiver of transceiver 606 can receive the message including the first load metric (or the data to determine the first load metric) and provide the message or the first WUSUV (or the data to determine the first load metric) to processor 602 or computer-readable medium 608 using system bus, network, or other connection mechanism 610. Processor 602 can determine the first load metric using the data to determine the load metric (e.g., as described with respect one or more of blocks 702 through 708). In accordance with this second respect, the first load metric can be stored within load metrics 620.

A processor that determines the first load metric can determine additional instances of a load metric that pertains to the first base station. One or more of the other instances of a load metric that pertains to the first base station can pertain to the first time period and one or more of the other instances of a load metric that pertains to the first base station can pertain to a different time period. Any of these additional instances of a load metric that pertains to the first base station can be stored within load metrics 620.

Next, block 804 includes determining, by the processor, a second load metric based on, at least in part, a variance of second WUSUV and an average of the second WUSUV, wherein the second WUSUV pertain to a second base station and the first time period. The second WUSUV can include a number of WUSUV equal to $P_{WUSUV}$.

In a first respect, the second load metric can be determined by a processor (e.g., processor 502) within the first base station (e.g., base station 104). Base station 106 can transmit a message (e.g., a MIB or SIB) including the second load metric or data to determine the second load metric (e.g., the second WUSUV or an average and a variance of the second WUSUV). A receiver of transceiver 606 can receive the message including the second load metric (or the data to determine the second load metric) and provide the message or the second WUSUV (or the data to determine the second load metric) to processor 602 or computer-readable medium 608 using system bus, network, or other connection mechanism 610. Processor 602 can determine the second load metric using the data to determine the load metric (e.g., as described with respect one or more of blocks 702 through 708). For example, processor 502 can determine the second load metric by executing the load metric determination CRPI (as described above with respect to block 708). In accordance with this first respect, the second load metric can be stored within load metrics 518.

In a second respect, the second load metric can be determined by a processor (e.g., processor 602) within a UE device (e.g., UE device 102). Base station 106 can transmit a message (e.g., a MIB or SIB) including the second load metric or data to determine the second load metric (e.g., the second WUSUV or an average and a variance of the second WUSUV). A receiver of transceiver 606 can receive the message including the second load metric (or the data to determine the second load metric) and provide the message or the second WUSUV (or the data to determine the second load metric) to processor 602 or computer-readable medium 608 using system bus, network, or other connection mechanism 610. Processor 602 can determine the second load metric using the data to determine the load metric (e.g., as described with respect one or more of blocks 702 through 708). In accordance with this second respect, the second load metric can be stored within load metrics 620.

A processor that determines the second load metric can determine additional instances of a load metric that pertains to the second base station. One or more of the other instances of a load metric that pertains to the second base station can pertain to the first time period and one or more of the other instances of a load metric that pertains to the second base station can pertain to a different time period. Any of these additional instances of a load metric that pertains to the second base station can be stored within load metrics 620.

Next, block 806 includes comparing, by the processor, at least the first load metric and the second load metric to determine a comparison of at least the first load metric and the second load metric. In a first respect, the comparison of at least first load metric and the second load metric can be determined by a processor (e.g., processor 502) within the first base station (e.g., base station 104). In a second respect, the comparison of at least first load metric and the second load metric can be determined by a processor (e.g., processor 602) within a UE device (e.g., UE device 102). In accordance with either or both those respects, the processor can execute load metric comparison CRPI to determine the comparison of at least first load metric and the second load metric. Moreover, a processor that determines the comparison of at least first load metric and the second load metric can determine comparisons of two other load metrics that correspond to a base station and a common time period using the load metric comparison CRPI or otherwise.

Next, block 808 includes selecting, by the processor, one of the at least the first base station and the second base station based on the comparison of at least the first load metric and the second load metric. In a first respect, the one of the at least the first base station and the second base station can be selected by a processor (e.g., processor 502) within the first base station (e.g., base station 104). In a second respect, the one of the at least the first base station and the second base station can be selected by a processor (e.g., processor 602) within a UE device (e.g., UE device 102). In accordance with either or both those respects, the processor can execute coverage area selection CRPI to select the one of the at least the first base station and the second base station. Moreover, a processor that selects the one of the at least the first base station and the second base station can perform other instances of selecting one of the at least the first base station and the second base station using the coverage area selection CRPI or otherwise.

Next, block 810 includes performing, by the processor, an action based on, at least in part, selecting the one of at least the first base station and the second base station. In a first respect, the action can be performed by a processor (e.g., processor 502) within the first base station (e.g., base station 104). In a second respect, the action can be performed by a processor (e.g., processor 602) within a UE device (e.g., UE device 102).

As an example, performing the action at block 810 by base station 104 can include processor 502 causing transceiver 504 to transmit a base station identification message identifying the base station selected at block 808. That message could include a directive for UE device 102 to camp on the identified base station or to hand over to the identified base station.

As another example, performing the action at block 810 by UE device 102 can include UE device 102 camping on the base station identified in the base station identification message. If UE device 102 was already camping on the identified base station, then UE device 102 continues camping on the identified base station. If UE device 102 was camping on a base station other than the identified base station, then UE device 102 transitions from camping on the other base station to camping on the identified base station.

As yet another example, performing the action at block 810 by UE device 102 can include UE device 102 handing over to the base station identified in the base station identification message. For instance, UE device 102, in response to receiving the base station identification message while connected to the base station 104, can hand over from base station 104 to base station 106.

III. Conclusion

Example embodiments have been described above. Those skilled in the art will understand that changes and modifications can be made to the described embodiments without departing from the true scope and spirit of the present invention, which is defined by the claims.

We claim:

1. A method comprising:
    determining, by at least one processor, a first set of multiple wireless uplink sub-frame use values (WUSUV), wherein each WUSUV of the first set corresponds to a separate transmission segment of a first time period, wherein the first time period comprises multiple separate transmission segments, wherein each WUSUV of the first set represents a count of how many different uplink resource blocks for a coverage area provided by a first base station are used or available during the separate transmission segment corresponding to that WUSUV, and wherein the first base station provides multiple different uplink resource blocks for the coverage area;
    determining, by the at least one processor, a variance of the first set of multiple WUSUV, wherein the variance of the first set of multiple WUSUV represents a variance of the counts of how many different uplink resource blocks for the coverage area provided by the first base station are used or available during the separate transmission segments of the first time period;
    determining, by the at least one processor, an average of the first set of multiple WUSUV, wherein the average of the first set of multiple WUSUV represents an average of the counts of how many different uplink resource blocks for the coverage area provided by the first base station are used or available during the separate transmission segments of the first time period;
    determining, by the at least one processor, a first load metric, based on, at least in part, the variance of the first set of multiple WUSUV and the average of the first set of multiple WUSUV; and
    transmitting, by a transmitter using a wireless downlink, at least one of the first load metric and a selection the at least one processor makes based on, at least in part, the first load metric.

2. The method of claim 1, wherein each WUSUV of the first set represents a count of how many different uplink resource blocks for the coverage area provided by the first base station are used during the separate transmission segment corresponding to that WUSUV.

3. The method of claim 1, wherein each WUSUV of the first set represents a count of how many different uplink resource blocks for the coverage area provided by the first base station are available during the separate transmission segment corresponding to that WUSUV.

4. The method of claim 1, wherein determining the first load metric includes determining a product of the variance of the first set of multiple WUSUV and the average of the first set of multiple WUSUV.

5. The method of claim 1, further comprising:
    determining, by the at least one processor, a second load metric, based on, at least in part, a variance of a second set of multiple WUSUV and an average of the second set of multiple WUSUV,
    wherein the variance of the second set of multiple WUSUV represents a variance of counts of how many different uplink resource blocks for a coverage area provided by a second base station are used or available during separate transmission segments to the second base station during the first time period, and
    wherein the selection is further based on the second load metric and indicates the first base station or the second base station is a target base station for a user equipment device.

6. The method of claim 5, wherein determining the second load metric includes a receiver of the first base station receiving the second load metric from the second base station.

7. The method of claim 5, wherein determining the second load metric includes a receiver of the first base station receiving the second set of multiple WUSUV from the second base station, the at least one processor determining the variance of the second set of multiple WUSUV, and the at least one processor determining the average of the second set of multiple WUSUV.

8. The method of claim 5, further comprising:
comparing, by the at least one processor, at least the first load metric and the second metric to determine a comparison of at least the first load metric and the second load metric,
wherein the selection is further based on the comparison of at least the first load metric and the second metric.

9. The method of claim 5,
wherein transmitting the at least one of the first load metric and the selection the at least one processor makes based on, at least in part, the first load metric includes transmitting the selection to a user equipment (UE) device,
the method further comprising:
determining, by the at least one processor, the UE device is operating at a cell edge of a coverage area provided by the first base station or the second base station,
wherein the selection is further based on the UE device operating at the cell edge.

10. A method comprising:
determining, by at least one processor, a first set of multiple wireless uplink sub-frame use values (WUSUV), wherein each WUSUV of the first set corresponds to a separate transmission segment of a first time period, wherein the first time period comprises multiple separate transmission segments, wherein each WUSUV of the first set represents a count of how many different uplink resource blocks for a first coverage area provided by a first base station are used or available during the separate transmission segment corresponding to that WUSUV of the first set, and wherein the first base station provides multiple different uplink resource blocks for the first coverage area;
determining, by the at least one processor, a second set of multiple WUSUV, wherein each WUSUV of the second set corresponds to a separate transmission segment of a second time period, wherein the second time period comprises multiple separate transmission segments, wherein each WUSUV of the second set represents a count of how many different uplink resource blocks for a second coverage area provided by a second base station are used or available during the separate transmission segment corresponding to that WUSUV of the second set, and wherein the second base station provides multiple different uplink resource blocks for the second coverage area;
determining, by the at least one processor, a first load metric based on, at least in part, a variance of the first set of multiple WUSUV and an average of the first set of multiple WUSUV, wherein the variance of the first set of multiple WUSUV represents a variance of the counts of how many different uplink resource blocks for the first coverage area are used or available during the separate transmission segments of the first time period;
determining, by the at least one processor, a second load metric based on, at least in part, a variance of a second set of multiple WUSUV and an average of the second set of multiple WUSUV, wherein the variance of the second set of multiple WUSUV represents a variance of the counts of how many different uplink resource blocks for the second coverage area are used or available during the separate transmission segments of the second time period;

comparing, by the at least one processor, at least the first load metric and the second load metric to determine a comparison of at least the first load metric and the second load metric;
selecting, by the at least one processor, one of at least the first base station and the second base station based on the comparison of at least the first load metric and the second load metric; and
performing, by the at least one processor, an action based on, at least in part, selecting the one of at least the first base station and the second base station.

11. The method of claim 10, wherein the first time period and the second time period are a common time period.

12. The method of claim 10, wherein the first time period and the second time period are different time periods.

13. The method of claim 10, wherein performing the action includes transmitting, by a transmitter, an identifier of the one of at least the first base station and the second base station selected by the at least one processor.

14. The method of claim 10, wherein performing the action includes causing a user equipment device operating in an idle mode to camp on the one of at least the first base station and the second base station selected by the at least one processor.

15. The method of claim 10, wherein performing the action includes causing a user equipment device to handover to the one of at least the first base station and the second base station selected by the at least one processor.

16. A system comprising:
at least one processor; and
a computer-readable medium storing computer-readable program instructions, that when executed by the at least one processor, perform a set of functions, wherein the set of functions comprises:
determining, by at least one processor, a first set of multiple wireless uplink sub-frame use values (WUSUV), wherein each WUSUV of the first set corresponds to a separate transmission segment of a first time period, wherein the first time period comprises multiple separate transmission segments, wherein each WUSUV of the first set represents a count of how many different uplink resource blocks for a first coverage area provided by a first base station are used or available during the separate transmission segment corresponding to that WUSUV of the first set, and wherein the first base station provides multiple different uplink resource blocks for the first coverage area;
determining, by the at least one processor, a second set of multiple WUSUV, wherein each WUSUV of the second set corresponds to a separate transmission segment of a second time period, wherein the second time period comprises multiple separate transmission segments, wherein each WUSUV of the second set represents a count of how many different uplink resource blocks for a second coverage area provided by a second base station are used or available during the separate transmission segment corresponding to that WUSUV of the second set, and wherein the second base station provides multiple different uplink resource blocks for the second coverage area;
determining, by the at least one processor, a first load metric based on, at least in part, a variance of the first set of multiple WUSUV and an average of the first set of multiple WUSUV, wherein the variance of the first set of multiple WUSUV represents a variance of the counts of how many different uplink resource blocks for the first coverage area are used or available during the separate transmission segments of the first time period;

determining, by the at least one processor, a second load metric based on, at least in part, a variance of the second set of multiple WUSUV and an average of the second set of multiple WUSUV, wherein the variance of the second set of multiple WUSUV represents a variance of the counts of how many different uplink resource blocks for the second coverage area are used or available during the separate transmission segments of the second time period;

comparing, by the at least one processor, at least the first load metric and the second metric to determine a comparison of at least the first load metric and the second load metric;

selecting, by the at least one processor, one of at least the first base station and the second base station based on the comparison of at least the first load metric and the second load metric; and performing, by the at least one processor, an action based on, at least in part, selecting the one of at least the first base station and the second base station.

17. The system of claim 16, further comprising:
a transmitter, wherein performing the action includes transmitting, by the transmitter, an identifier of the one of at least the first base station and the second base station selected by the at least one processor.

18. The system of claim 16, wherein selecting the one of at least the first base station and the second base station based on the comparison of at least the first load metric and the second load metric includes selecting a base station based on a load metric that indicates availability of a greater number of uplink radio frequency transmission opportunities.

19. The system of claim 16, wherein the computer-readable medium stores application requirements corresponding to a user equipment (UE) device and a cell edge list including data that indicates whether the UE device is operating within a cell edge of a coverage area provided by the first base station or the second base station.

20. The system of claim 16, wherein the action is selected from the group consisting of (i) transmitting, by a transmitter, an identifier of the one of at least the first base station and the second base station selected by the at least one processor, (ii) causing a user equipment device operating in an idle mode to camp on the one of at least the first base station and the second base station selected by the at least one processor, and (iii) causing a user equipment device to handover to the one of at least the first base station and the second base station selected by the at least one processor.

21. The method of claim 12,
wherein determining the first load metric includes receiving, by a receiver from the first base station, at least one of (i) the first load metric, (ii) the variance of the first set of multiple WUSUV and the average of the first set of multiple WUSUV, and (iii) the first set of multiple WUSUV,
wherein determining the second load metric includes receiving, by the receiver from the second base station, at least one of (i) the second load metric, (ii) the variance of the second set of multiple WUSUV and the average of the second set of multiple WUSUV, and (iii) the second set of multiple WUSUV.

22. The method of claim 21,
wherein receiving the at least one of the first load metric, the variance of the first set of multiple WUSUV and the average of the first set of multiple WUSUV, and the first set of multiple WUSUV includes receiving (i) a master information block (MIB) including the at least one of the first load metric, the variance of the first set of multiple WUSUV and the average of the first set of multiple WUSUV, and the first set of multiple WUSUV, or (ii) a system information block (SIB) including the at least one of the first load metric, the variance of the first set of multiple WUSUV and the average of the first set of multiple WUSUV, and the first set of multiple WUSUV, and
wherein receiving the at least one of the second load metric, the variance of the second set of multiple WUSUV and the average of the second set of multiple WUSUV, and the second set of multiple WUSUV includes receiving (i) a MIB including the at least one of the second load metric, the variance of the second set of multiple WUSUV and the average of the second set of multiple WUSUV, and the second set of multiple WUSUV, or (ii) a SIB including the at least one of the second load metric, the variance of the second set of multiple WUSUV and the average of the second set of multiple WUSUV, and the second set of multiple WUSUV.

23. The system of claim 16, wherein the first time period and the second time period are a common time period.

24. The system of claim 16, wherein the first time period and the second time period are different time periods.

* * * * *